United States Patent
Turner et al.

(10) Patent No.: US 10,344,601 B2
(45) Date of Patent: Jul. 9, 2019

(54) CONTOURED FLOWPATH SURFACE

(71) Applicant: United Technologies Corporation, Hartford, CT (US)

(72) Inventors: Matthew A. Turner, Wallingford, CT (US); Andrew G. Alarcon, Manchester, CT (US); James Glaspey, Farmington, CT (US); Brian Green, New Haven, CT (US); Barry M. Ford, Middletown, CT (US); Renee J. Jurek, Colchester, CT (US)

(73) Assignee: United Technologies Corporation, Hartford, CT (US)

( * ) Notice: Subject to any disclaimer, the term of this patent is extended or adjusted under 35 U.S.C. 154(b) by 584 days.

(21) Appl. No.: 14/421,645

(22) PCT Filed: Mar. 15, 2013

(86) PCT No.: PCT/US2013/032189
§ 371 (c)(1),
(2) Date: Feb. 13, 2015

(87) PCT Pub. No.: WO2014/028056
PCT Pub. Date: Feb. 20, 2014

(65) Prior Publication Data
US 2015/0204201 A1 Jul. 23, 2015

Related U.S. Application Data

(60) Provisional application No. 61/684,490, filed on Aug. 17, 2012.

(51) Int. Cl.
*F01D 5/14* (2006.01)
*F01D 5/30* (2006.01)
(Continued)

(52) U.S. Cl.
CPC .................. *F01D 5/30* (2013.01); *F01D 5/02* (2013.01); *F01D 5/143* (2013.01); *F01D 5/145* (2013.01);
(Continued)

(58) Field of Classification Search
CPC ........... F01D 5/30; F01D 5/143; F01D 11/008
See application file for complete search history.

(56) References Cited

U.S. PATENT DOCUMENTS 2,918,254 A 12/1959 Hausammann
3,294,364 A * 12/1966 Stanley ................. F01D 5/3007
416/193 A
(Continued)

FOREIGN PATENT DOCUMENTS

EP 1503044 A1 2/2005
EP 1 681 438 A1 7/2006
(Continued)

OTHER PUBLICATIONS

Extended European Search Report for EP Application No. 13829595. 1, dated Mar. 11, 2016, 8 pages.
(Continued)

*Primary Examiner* — Kayla Mccaffrey
(74) *Attorney, Agent, or Firm* — Kinney & Lange, P.A.

(57) ABSTRACT

A spacer assembly for a rotor assembly of a gas turbine engine includes an endwall segment having a non-axisymmetric flowpath surface, a first depression and a second depression. A perimeter of the flowpath surface includes a forward edge, an aft edge, a suction side edge and a pressure side edge. The first depression is formed along the flowpath surface adjoining the suction side edge, and the second depression is formed along the flowpath surface adjoining the pressure side edge.

20 Claims, 8 Drawing Sheets

(51) Int. Cl.
*F01D 5/02* (2006.01)
*F01D 11/00* (2006.01)

(52) U.S. Cl.
CPC ........ *F01D 11/008* (2013.01); *F05D 2220/32* (2013.01); *F05D 2240/55* (2013.01); *Y02T 50/673* (2013.01)

(56) References Cited

U.S. PATENT DOCUMENTS

| | | |
|---|---|---|
| 3,529,631 A | 9/1970 | Riollet |
| 3,712,757 A | 1/1973 | Goodwin |
| 4,135,857 A | 1/1979 | Pannone et al. |
| 4,371,311 A | 2/1983 | Walsh |
| 4,420,288 A | 12/1983 | Bischoff |
| 4,465,433 A | 8/1984 | Bischoff |
| 4,500,256 A | 2/1985 | Bessay et al. |
| 4,580,946 A | 4/1986 | Bobo |
| 4,621,979 A | 11/1986 | Zipps et al. |
| 4,677,828 A | 7/1987 | Matthews et al. |
| 4,778,338 A | 10/1988 | Bessay |
| 4,832,567 A | 5/1989 | Bessay |
| 4,838,759 A | 6/1989 | Dunn et al. |
| 5,193,982 A * | 3/1993 | Inizan .................... F01D 11/008 416/193 A |
| 5,224,831 A | 7/1993 | Hermans et al. |
| 5,397,215 A | 3/1995 | Spear et al. |
| 5,464,326 A | 11/1995 | Knott |
| 5,466,123 A | 11/1995 | Rose |
| 5,554,000 A | 9/1996 | Katoh et al. |
| 5,890,874 A | 4/1999 | Lambert et al. |
| 5,957,658 A | 9/1999 | Kasprow et al. |
| 6,017,186 A | 1/2000 | Hoeger et al. |
| 6,146,089 A | 11/2000 | Allen et al. |
| 6,158,961 A | 12/2000 | Kehl et al. |
| 6,213,711 B1 | 4/2001 | Muller et al. |
| 6,217,283 B1 | 4/2001 | Ravenhall et al. |
| 6,276,897 B1 | 8/2001 | Tarada |
| 6,283,713 B1 | 9/2001 | Harvey et al. |
| 6,338,611 B1 | 1/2002 | Anderson et al. |
| 6,419,446 B1 | 7/2002 | Kvasnak et al. |
| 6,447,250 B1 * | 9/2002 | Corrigan ............... F01D 11/008 416/193 A |
| 6,457,942 B1 | 10/2002 | Forrester |
| 6,471,474 B1 | 10/2002 | Mielke et al. |
| 6,478,539 B1 | 11/2002 | Trutschel |
| 6,478,545 B2 | 11/2002 | Crall et al. |
| 6,481,971 B1 | 11/2002 | Forrester |
| 6,511,294 B1 | 1/2003 | Mielke et al. |
| 6,514,045 B1 | 2/2003 | Barton et al. |
| 6,520,742 B1 | 2/2003 | Forrester et al. |
| 6,524,070 B1 | 2/2003 | Carter |
| 6,561,761 B1 | 5/2003 | Decker et al. |
| 6,579,061 B1 | 6/2003 | Heyward et al. |
| 6,634,863 B1 | 10/2003 | Forrester et al. |
| 6,669,445 B2 | 12/2003 | Staubach et al. |
| 6,672,832 B2 | 1/2004 | Lecke et al. |
| 6,705,834 B1 | 3/2004 | Jacobsson |
| 6,786,698 B2 | 9/2004 | Warner et al. |
| 6,830,432 B1 | 12/2004 | Scott et al. |
| 6,857,853 B1 | 2/2005 | Tomberg et al. |
| 6,969,232 B2 | 11/2005 | Zess et al. |
| 7,080,974 B2 | 7/2006 | Lejars et al. |
| 7,134,842 B2 | 11/2006 | Tam et al. |
| 7,195,454 B2 | 3/2007 | Lu et al. |
| 7,217,096 B2 | 5/2007 | Lee |
| 7,220,100 B2 | 5/2007 | Lee et al. |
| 7,249,933 B2 | 7/2007 | Lee et al. |
| 7,354,243 B2 | 4/2008 | Harvey |
| 7,465,155 B2 | 12/2008 | Nguyen |
| 7,484,935 B2 | 2/2009 | Heitland et al. |
| 7,553,125 B2 | 6/2009 | Audic et al. |
| 7,637,010 B2 | 12/2009 | Burgess et al. |
| 7,690,890 B2 | 4/2010 | Aotsuka et al. |
| 7,739,865 B2 | 6/2010 | Prasad et al. |
| 7,841,828 B2 | 11/2010 | Liang |
| 7,874,794 B2 | 1/2011 | Solomon et al. |
| 7,878,763 B2 * | 2/2011 | Keith ..................... F01D 5/147 416/193 A |
| 7,887,297 B2 | 2/2011 | Allen-Bradley et al. |
| 7,950,900 B2 | 5/2011 | Mulcaire et al. |
| 8,061,980 B2 | 11/2011 | Praisner et al. |
| 8,070,438 B2 | 12/2011 | Evans |
| 8,105,019 B2 | 1/2012 | McCaffrey et al. |
| 8,113,785 B2 | 2/2012 | Forgue et al. |
| 8,192,153 B2 | 6/2012 | Harvey et al. |
| 8,202,043 B2 | 6/2012 | McCaffrey |
| 8,206,115 B2 | 6/2012 | Gupta et al. |
| 8,246,310 B2 | 8/2012 | Pierrot et al. |
| 8,297,935 B2 | 10/2012 | Mtilin et al. |
| 8,342,803 B2 | 1/2013 | Grohens et al. |
| 8,348,619 B2 | 1/2013 | Derclaye et al. |
| 2007/0258818 A1 * | 11/2007 | Allen-Bradley ........ F01D 5/145 416/193 A |
| 2008/0135530 A1 | 6/2008 | Lee et al. |
| 2008/0232968 A1 | 9/2008 | Nguyen |
| 2008/0267772 A1 | 10/2008 | Harvey et al. |
| 2009/0035130 A1 | 2/2009 | Sonoda et al. |
| 2009/0053066 A1 | 2/2009 | Lida |
| 2009/0148282 A1 | 6/2009 | McCaffrey et al. |
| 2010/0080376 A1 | 4/2010 | Gupta et al. |
| 2010/0143139 A1 | 6/2010 | Pandey et al. |
| 2010/0150724 A1 * | 6/2010 | Forgue ................. F01D 5/3007 416/219 R |
| 2010/0166558 A1 | 7/2010 | Siden et al. |
| 2010/0172749 A1 | 7/2010 | Mitsuhashi et al. |
| 2010/0196154 A1 | 8/2010 | Sakamoto et al. |
| 2010/0254797 A1 | 10/2010 | Grover et al. |
| 2010/0274818 A1 | 11/2010 | Sakamoto et al. |
| 2010/0284818 A1 | 11/2010 | Sakamoto et al. |
| 2011/0014056 A1 | 1/2011 | Guimbard et al. |
| 2011/0038731 A1 | 2/2011 | Evans |
| 2011/0044818 A1 | 2/2011 | Kuhne et al. |
| 2011/0110788 A1 | 5/2011 | Guimbard et al. |
| 2011/0123322 A1 | 5/2011 | Allen-Bradley et al. |
| 2011/0189023 A1 | 8/2011 | Guimbard et al. |
| 2011/0223005 A1 | 9/2011 | Lee et al. |
| 2011/0236200 A1 | 9/2011 | Grover et al. |
| 2011/0243749 A1 | 10/2011 | Praisner et al. |
| 2012/0014776 A1 | 1/2012 | Fulayter et al. |
| 2012/0057988 A1 | 3/2012 | Stiehler |
| 2012/0121384 A1 | 5/2012 | Borufka et al. |
| 2012/0201688 A1 | 8/2012 | Mahle et al. |
| 2012/0201692 A1 | 8/2012 | Boston et al. |
| 2012/0251312 A1 | 10/2012 | Johann et al. |
| 2012/0251324 A1 | 10/2012 | Johann et al. |
| 2012/0251325 A1 | 10/2012 | Dunkel et al. |
| 2012/0263587 A1 | 10/2012 | Hergt et al. |
| 2012/0269619 A1 | 10/2012 | Johann |
| 2013/0004331 A1 | 1/2013 | Beeck |
| 2014/0003949 A1 | 1/2014 | Adam et al. |

FOREIGN PATENT DOCUMENTS

| | | |
|---|---|---|
| EP | 2 447 476 A2 | 5/2012 |
| FR | 1442526 A | 6/1966 |
| GB | 2 042 675 A | 9/1980 |
| GB | 2257755 A | 1/1993 |
| GB | 2 388 162 A | 11/2003 |
| WO | WO 2010/068391 A2 | 6/2010 |
| WO | WO 2012/007716 A2 | 1/2012 |

OTHER PUBLICATIONS

M. G. Rose, "Non-Axisymmetric Endwall Profiling in the HP NGV's of an Axial Flow Gas Turbine", ASME 94-GT-249, presented at the Int'l. Gas Turbine and Aeroengine Congress and Exposition, Jun. 13-16, 1994, 8 pages.

Dr. N. W. Harvey, et al., "Non-Axisymmetric Turbine End Wall Design: Part I Three-Dimensional Linear Design System", ASME 99-GT-337, presented at Int'l. Gas Turbine and Aeroengine Congress and Exhibiton, Jun. 7-10, 1999, 9 pages.

(56) References Cited

OTHER PUBLICATIONS

J. C. Hartland, et al., "Nonaxisymmetric Turbine End Wall Design: Part II—Experimental Validation", from Journal of Turbomachinery, vol. 122, Apr. 2000, pp. 286-293.

N. W. Harvey, et al., "Improving Turbine Efficiency Using Non-Axisymmetric End Walls: Validation in the Multi-Row Environment and with Low Aspect Ratio Blading", ASME GT-2002-30337, proceedings of ASME Turbo Expo 2002, 8 pages.

N. W. Harvey, et al., "Nonaxisymmetric Turbine End Wall Design: Part I—Three-Dimensional Linear Design System", rom Journal of Turbomachinery, vol. 122, Apr. 2000, pp. 278-285.

G. Ingram, et al., "The Effect of End-Wall Profiling on Secondary Flow and Loss Development in a Turbine Cascade", ASME GT-2002-30339, proceedings of ASME Turbo Expo 2002, Jun. 3-6, 2001, pp. 135-145.

G. Brennan, et al., "Improving the Efficiency of the Trent 500-HP Turbine Using Nonaxisymmetric End Walls—Part I: Turbine Design", from Journal of Turbomachinery, vol. 125, Jul. 2003; pp. 497-504.

M. Hoeger, et al., "On the Performance of Compressor Blades with Contoured Endwalls", from http://www.mtu.de/en/technologies/engineering_news/development/Hoeger_Performance_of_compressor_blades_en.pdf, accessed Jan. 7, 2013, 10 pages.

L. Fengjun, et al., "Bowed and Twisted Blade Influence on a Turbine Three Dimensional Pressure Field", from Journal of Engineering Thermophysics, vol. 17 Suppl., Dec. 1996, 10 pages.

S. Jiexian et al., "Application of a Bowed Blade in a Compressor", from Journal of Engineering Thermophysics, vol. 11, No. 4, Nov. 1990, 9 pages.

S. Jiexian et al., "Bowed and Twisted Compound Blade Control of Secondary Flow", from Journal of Aerospace Power, vol. 6, No. 4, Oct. 1991, 5 pages.

International Search Report and Written Opinion from PCT Application U.S. Appl. No. PCT/US2013/032189, dated Jan. 16, 2014, 12 pages.

* cited by examiner

CONTOURED FLOWPATH SURFACE

BACKGROUND

The present invention relates generally to endwall flowpath surface contours for gas turbine engines, and more particularly to non-axisymmetric endwall flowpath surface contours.

Gas turbine engines are well-known, and generally include various rotating and non-rotating airfoils arranged in cascades. These airfoils include fluid working surfaces that can interact with working fluids along an engine flowpath during engine operation. Endwalls are structures that bound portions of the engine flowpath, typically at radially inner and outer locations along the flowpath. These endwalls can adjoin the airfoils. In some instances, endwalls are defined by platforms or shrouds integral to the airfoil. In other instances, endwalls are defined by structures separate from the airfoils, such as ducts, shrouds, spacers and the like.

In the past, endwalls in gas turbine engines generally had axisymmetric contours, meaning the endwall was symmetric in rotation about a central axis (i.e, cylindrical, frustoconical or toroidal). Such axisymmetric endwall contours do not always provide optimal adiabatic efficiency and flow capacity, particularly due to secondary flow effects where some of the working fluid inefficiently moves in a spanwise (i.e., generally radial) direction along the working surfaces of the airfoils (with or without swirl or vortex effects).

SUMMARY

A spacer assembly for a rotor assembly of a gas turbine engine includes an endwall segment having a non-axisymmetric flowpath surface, a first depression and a second depression. A perimeter of the flowpath surface includes a forward edge, an aft edge, a suction side edge and a pressure side edge. The first depression is formed along the flowpath surface adjoining the suction side edge, and the second depression is formed along the flowpath surface adjoining the pressure side edge.

Figure 1:
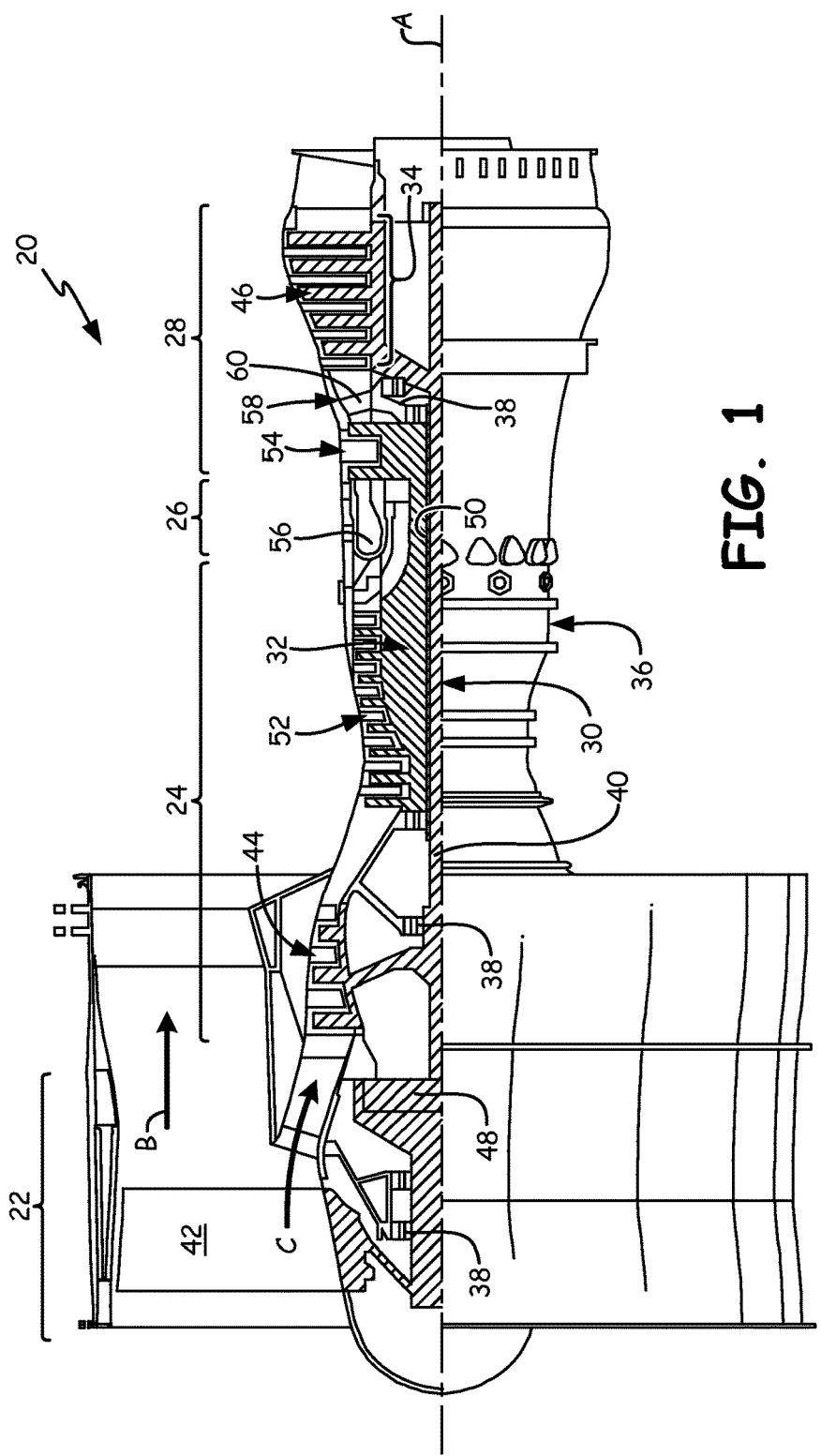
FIG. 1 is a schematic quarter sectional view of an embodiment of a gas turbine engine.

While the above-identified figures set forth embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

The present application claims priority to U.S. Provisional Patent Application Ser. No. 61/684,490, entitled "Contoured Flowpath Blade Platform," filed Aug. 17, 2012, which is hereby incorporated by reference in its entirety.

A rotor (e.g., fan) assembly can have an endwall with a non-axisymmetric flowpath surface contour with one or more depressions along the pressure and/or suction side edges adjoining adjacent airfoils. These one or more depressions can produce localized radial "elevation" changes in the flowpath surface, which can depart in a negative radial direction from a nominal axisymmetric shape of surrounding portions of the flowpath surface contour in some embodiments. Furthermore, the flowpath surface contour can in addition or in the alternative include one or more protrusions, which can depart in a positive radial direction from the nominal axisymmetric shape of surrounding portions of the flowpath surface contour in some embodiments. Such a rotor assembly can be used in a gas turbine engine. In various embodiments, such a non-axisymmetric flowpath surface contour can be implemented on spacers that are secured to a rotor disk (e.g., fan hub) separate and independent from airfoils carried by the rotor disk. Persons of ordinary skill in the art will recognize various features and benefits of the present invention in view of the description that follows.

FIG. 1 is a quarter sectional view that schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example, an industrial gas turbine; a reverse-flow gas turbine engine; and a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 can be arranged generally between the high pressure turbine 54 and the low pressure turbine 46. The mid-turbine frame 58 further supports bearing systems 38 in the turbine section 28 as well as setting airflow entering the low pressure turbine 46.

The core airflow C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of [(Tram ° R)/518.7) 0.5]. The "Low corrected fan tip speed", as disclosed herein according to one non-limiting embodiment, is less than about 1150 ft/second.

The example gas turbine engine 20 includes the fan 42 that comprises in one non-limiting embodiment less than about 26 fan blades. In another non-limiting embodiment, the fan section 22 includes less than about 20 fan blades. Moreover, in one disclosed embodiment the low pressure turbine 46 includes no more than about 6 turbine rotors schematically indicated at 34. In another non-limiting example embodiment the low pressure turbine 46 includes about 3 turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

Figure 2:
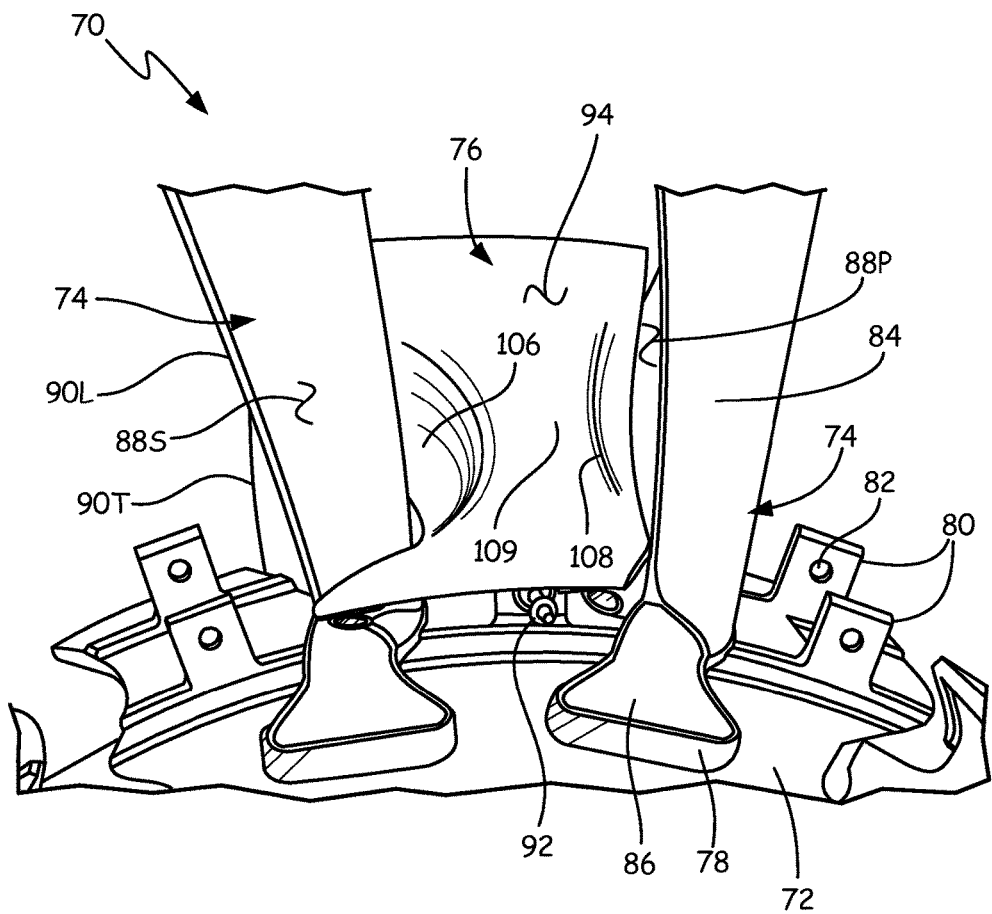
FIG. 2 is a front perspective view of one embodiment of a portion of a rotor assembly for the gas turbine engine.

FIG. 2 is a front perspective view of one embodiment of a portion of a rotor assembly 70 for the gas turbine engine 20, shown only partially assembled. In the illustrated embodiment, the assembly 70 includes a rotor disk 72, a plurality of airfoils 74, and a spacer 76. It should be noted that in the illustrated partially assembled state only a pair of airfoils 74 are shown and only a single spacer 76. In a fully assembled state, additional airfoils can be provided circumferentially spaced from one another in a cascade configuration, together with additional spacers 76. Alternatively, the assembly 70 could be configured as a non-rotating stator assembly.

The rotor disk 72, which can be a fan hub or have another configuration suitable for use in another section of the engine 20, can include one or more grooves 78 in an outer diameter rim portion, as well as mounting flanges 80. In the illustrated embodiment, a plurality of curved, generally axially extending grooves 78 having a dovetail shape are provided. In alternative embodiments, the grooves 78 can have other shapes (e.g., fir tree, etc.), lack a curve, be configured as a single circumferential groove, or have other design variations as desired. The mounting flanges 80 in the illustrated embodiment are tab-like structures that extend radially outward from the rim of the disk 72 and are arranged in generally axially-spaced pairs, with each pair positioned between a pair of the grooves 78. A mounting hole 82 can be provided in each flange 80.

The airfoils 74, which can be configured as fan blades or any other type of blades or stators, each have an aerodynamically shaped working portion 84 and a root portion 86. The working portion 84 includes a pressure side 88P and an opposite suction side 88S that both extend between a leading edge 90L and an opposite trailing edge 90T. Typically the pressure side 88P is at least partially concave and the suction side is at least partially convex to provide a cambered airfoil profile. The working portion 84 is configured to interact with fluid flows, such as core flow C and/or bypass flow B. Persons of ordinary skill in the art will appreciate that the working portion 84 of the airfoils 74 can have any configuration as desired for particular applications. The root portion 86 of the airfoils 74 can have a shape that is complementary to the grooves 78 in the disk 72, and helps to retain the airfoil 84 relative to the rotor disk 72. In the illustrated embodiment, the root portion 86 has a dovetail shape, though in further embodiments other shapes are possible (e.g., fir tree, hammerhead, etc.). Furthermore, in the illustrated embodiment the airfoils 74 lack an integral platform. The airfoils 74 and rotor disk 72 are illustrated merely by way of example and not limitation. Numerous other configurations are possible in further embodiments. For example, the airfoils 74 and the disk 72 can be integrally formed in an integrally bladed disk (blisk) configuration.

The spacer 76 is positioned between an adjacent pair of the airfoils 74, and is removably attached to the rotor disk 72 separate from the airfoils 74. The spacer 76 can have an axial length comparable to a chord length of the airfoils 74 at the spanwise location where the spacer 76 adjoins the working portion 84 of the airfoil 74, with the spacer 76 extending slightly forward of the leading edge 90L and slightly aft of the trailing edge 90T. In the illustrated embodiment, the spacer 76 is mechanically attached to a pair of the flanges 80. A fastener 92 (e.g., a pin) is provided that engages the holes 82 in the flanges 80 to secure the spacer 76. In a fully assembled state, one spacer 76 can be provided between each adjacent pair of the airfoils 74. In further embodiments, multiple spacers 76 could be present between any given adjacent pair of the airfoils 74.

In general, the spacer 76 can act as an endwall segment to at least partially bound a fluid flowpath through the engine 20, such as for core flow C. More particularly, the spacer 76 can help separate and space the core flow C (or other flow) from the rotor disk 72 and the roots 86 of the airfoils 74. In the illustrated embodiment, the spacers 76 form segments along a radially inner portion of an endwall of the assembly 70. As will be explained further below, the spacer 76 can be shaped to provide desired aerodynamic characteristics as fluid flows past the assembly 70, for instance, to help reduce undesired secondary flow, which can occur where some working fluid moves in a spanwise (i.e., generally radial) direction along the working portion 84 of the airfoils 74 (with or without swirl or vortex effects).

Figure 3:
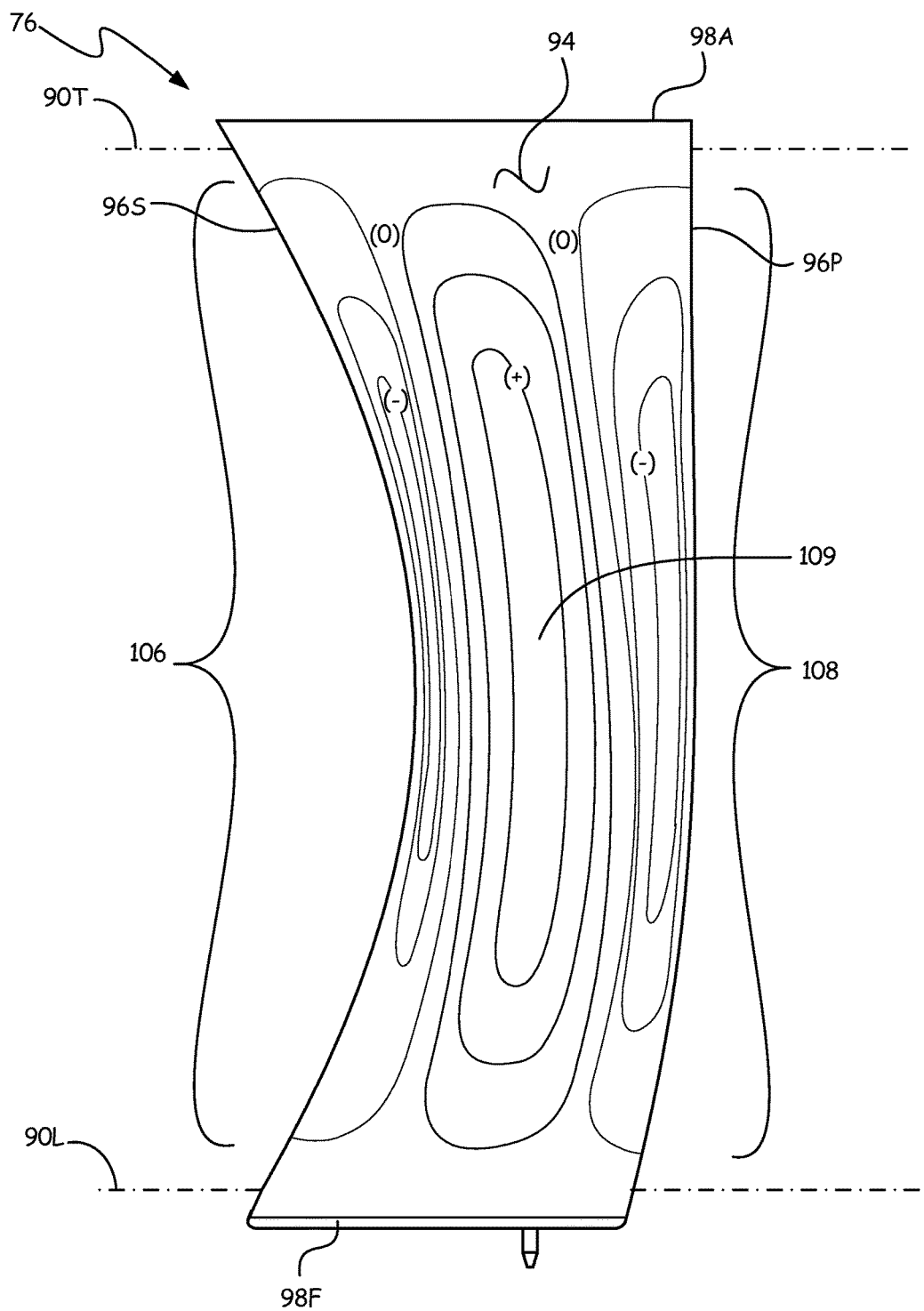
FIG. 3 is a plan view of a spacer of the rotor assembly of FIG. 2.
Figure 4:
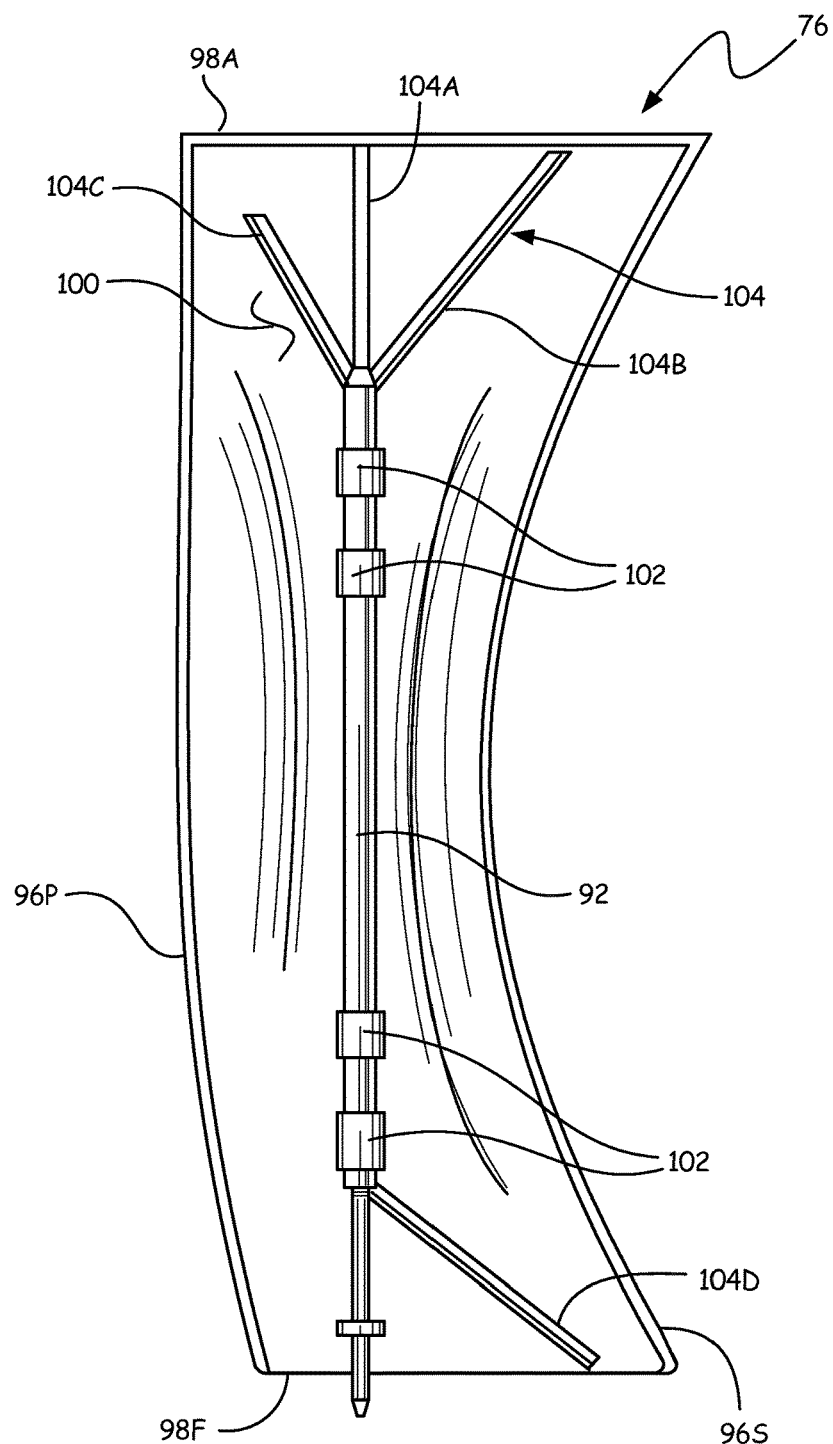
FIG. 4 is a bottom view of the spacer of FIG. 3.

FIG. 3 is a plan view of the spacer 76, and FIG. 4 is a bottom view of the spacer 76. Elevation lines are shown in FIG. 3 to illustrate relative elevation, in the radial direction, for selected portions of the spacer 76, as discussed further below. A zero ("0") symbol is shown to designate portions of the spacer 76 at a nominal axisymmetric elevation. A negative ("−") symbol is shown to designate a relative decrease in elevation in the radial direction for the illustrated elevation lines relative to the nominal axisymmetric baseline. A positive ("+") symbol is shown to designate a relative increase in elevation in the radial direction for the illustrated elevation lines relative to the nominal axisymmetric baseline. As shown in FIG. 3, the spacer 76 includes a flowpath surface 94 that extends to a perimeter defined, at least in part, by a pressure side edge 96P, a suction side edge 96S, an aft edge 98A and a forward edge 98F. The pressure side edge 96P can have a curvilinear shape configured to complement a shape of the pressure sides 88P of the airfoils 74. The suction side edge 96S is located generally opposite the pressure side edge 96P and can have a curvilinear shape configured to complement a shape of the suction sides 88S of the airfoils 74. The aft edge 98A is located generally opposite the forward edge 98F. In the illustrated embodiment, the forward and aft edges 98F and 98A are each oriented substantially perpendicular to the engine centerline axis A. When the spacer 76 is installed in the assembly 70 between a pair of adjacent airfoils 74 (see FIG. 2), the pressure side edge 96P can be positioned adjacent to the pressure side 88P of one of the pair of adjacent airfoils 74 and the suction side edge 96S can be positioned adjacent to the suction side 88S of the other of the pair of adjacent airfoils 74.

As shown in FIG. 4, the spacer 76 includes an underside surface 100 located generally opposite the flowpath surface 94, which can likewise extend to a perimeter defined, at least in part, by the pressure side edge 96P, the suction side edge 96S, the aft edge 98A and the forward edge 98F. A mounting structure 102 can extend from the underside surface 100 (see also FIGS. 5, 6 and 8-10). In the illustrated embodiment, the mounting structure 102 comprises a plurality of generally axially spaced and radially extending structures that can engage the fastener 92 (e.g., pin) to help retain the spacer 76 to the flanges 80 of the rotor disk 72.

Furthermore, the spacer 76 can include a stiffening structure 104 on the underside surface 100. In the embodiment shown in FIG. 4, the stiffening structure 104 includes a plurality of ribs 104A-104D, with a generally axially extending central rib 104A and a pair of opposing aft ribs 104B and 104C that extend laterally at angles from the central rib 104A and a forward rib 104D that extends laterally at an angle from the central rib 104A. In the illustrated embodiment, the aft ribs 104B and 104C and the forward rib 104D are arranged at acute angles with respect to the central rib 104A, such as approximately 30-50°, or with the rib 104B at an approximately 40° angle (facing aft) and/or with the rib 104C at an approximately 30° angle (facing aft) and/or with the rib 104D at an approximately 50° angle (facing forward). The ribs of the stiffening structure 104 can be spaced from depressions in the spacer 76, which are explained further below. In further embodiments, the stiffening structure 104 can have any desired configuration, such as including more or fewer ribs in any arrangement, and/or including other stiffening structures. The stiffening structure 104 helps provide stiffness and structural support to the spacer 76 while allowing the spacer to be relatively thin between the flowpath surface 94 and the underside surface 100 (and therefore relatively low in mass) and without interrupting the flowpath surface 94.

In the illustrated embodiment, the stiffening structure 104 and the mounting structure 102 are both integrally and monolithically formed with a remainder of the spacer 76. For example, the mounting structure can extend from the stiffening structure 104, such as from the central rib 104A. In further embodiments the stiffening structure 104 and the mounting structure 102 could be separate and spaced from one another, and need not be integral with the remainder of the spacer 76.

Figure 5:
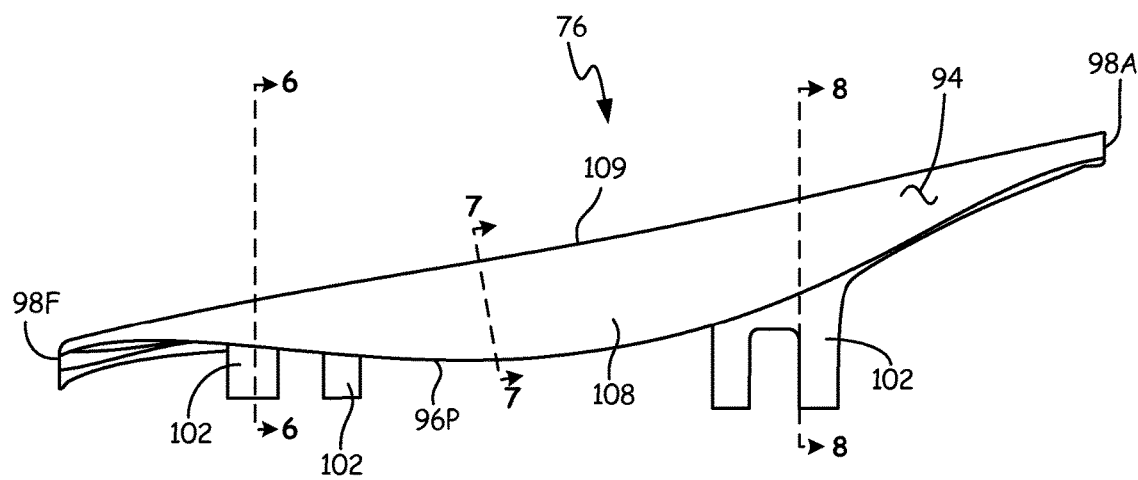
FIG. 5 is an elevation view of the spacer, shown in isolation.
Figure 6:
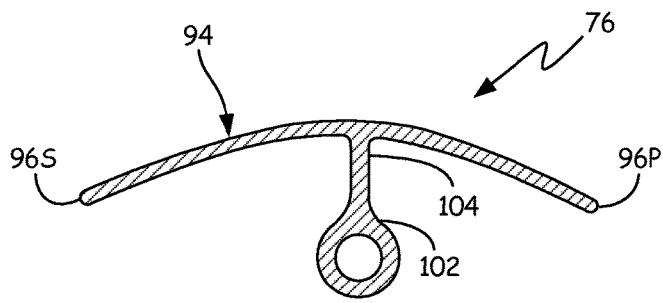
FIGS. 6-8 are cross-sectional views of the spacer taken along lines 6-6, 7-7 and 8-8, respectively, in FIG. 5.
Figure 7:
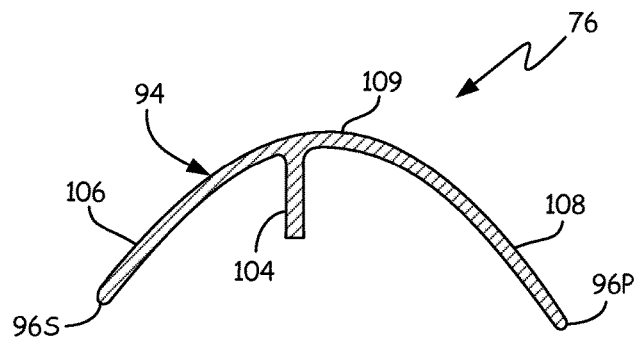
Figure 8:
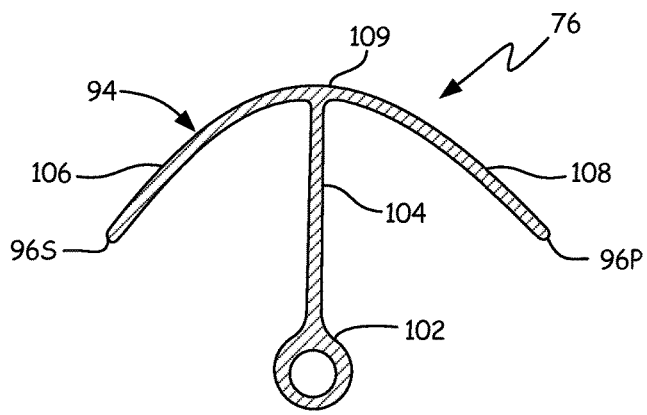

FIG. 5 is an elevation view of the spacer 76, shown in isolation, and FIGS. 6-8 are cross-sectional views of the spacer taken along lines 6-6, 7-7 and 8-8, respectively, in FIG. 5. As shown in FIG. 5, the flowpath surface 94 of the spacer 76 defines a generally frustoconical endwall segment in the generally axial direction, that is, between the front edge 98F and the aft edge 98A. The spacer 76 can also be configured such that the flowpath surface 94 is non-axisymmetric. As shown in the illustrated embodiment in FIGS. 6-8, the spacer 76 is configured such that the flowpath surface 94 has a generally convex, arcuate shape in the circumferential direction, between the pressure and suction side edges 96P and 96S, due to a cascade configuration of the assembly 70. Depressions and/or protrusions can optionally be provided along the flowpath surface 94. The illustrated embodiment of the spacer 76 includes depressions along the flowpath surface 94, as explained further below.

The pressure and suction side edges 96P and 96S can each be radiused. Because the spacer 76 is connected to the rotor disk 72 independently of the airfoils 74, there may be relative movement between the spacer 76 and the airfoils 74 during operation. The radius of the pressure and suction side edges 96P and 96S can help reduce a risk of damage to the airfoils 74 should contact occur.

As best shown in FIG. 3, a first depression 106 is located on the flowpath surface 94 adjoining the suction side edge 96S, and a second depression 108 is located on the flowpath surface 94 adjoining the pressure side edge 96P. The first and second depressions 106 and 108 are localized endwall contour features that locally decrease the elevation of the flowpath surface 94 in the radial direction. In that way, the first and second depressions 106 and 108 locally alter the concave shape of the flowpath surface 94, which can help reduce secondary flows during operation in the engine 20, and can help increase adiabatic efficiency and flow capacity. One way to conceptualize the depressions 106 and 108 is as deviations (Δ) from a nominal (i.e., hypothetical) axisymmetric shape of the flowpath surface 94 (e.g., as deviations from a generally frustoconical segment). The first and second depressions 106 and 108 can extend to reach the perimeter of the flowpath surface 94. For example, a local minimum radial elevation of the flowpath surface 94 can occur in the first or second depression 106 or 108 along the perimeter (e.g., along the pressure or suction side edge 96P or 96P).

In the illustrated embodiment, the first and second depressions 106 and 108 are each generally concave in shape and are spaced apart in the circumferential direction. Furthermore, the first and second depressions 106 and 108 can each be positioned aft of the forward edge 98F of the spacer 76 and forward of the aft edge 98A of the spacer 76. When installed in the assembly 70, the depressions 106, 108 can each be positioned aft of the leading edges 90L of the airfoils 74 and forward of the trailing edges 90T of the airfoils 74. Possible axial locations of leading and trailing edges 90L and 90T are illustrated in FIG. 3, for reference purposes. In that way, the first and second depressions 106 and 108 can be localized at a generally mid-chord region relative to the pair of adjacent airfoils 74 that are adjacent to the spacer 76. One or both of the first and second depressions 106 or 108 can have a normalized length that is approximately 93-94% of a root chord dimension of at least one of the airfoils 74. As used herein, "root chord" refers to a chord dimension at a spanwise location where the flowpath surface 94 intersects the airfoil 74. Further, in the illustrated embodiment, the first and second depressions 106 and 108 each have a normalized maximum depth that is approximately 6-7% of the root chord dimension of at least one of the airfoils 74. In this way, the maximum depth of the first or second depression 106 or 108 can be approximately 6-8% of its length. It should be noted that the shape of the flowpath surface 94 is shown merely by way of example and not limitation. For example, additional depressions, protrusions or the like can also be utilized as desired for particular applications.

In addition, a protrusion 109 is located on the flowpath surface 94 in the illustrated embodiment. The protrusion 109 is a localized endwall contour feature that locally increases the elevation of the flowpath surface 94 in the radial direction. In that way, the protrusion 109 locally alters the concave shape of the flowpath surface 94, which can help reduce secondary flows during operation in the engine 20, and can help increase adiabatic efficiency and flow capacity, in conjunction with the depressions 106 and 108, such as helping to reduce secondary flow effects along the airfoils 74. One way to conceptualize the protrusion is as a deviation (Δ) from the nominal (i.e., hypothetical) axisymmetric shape of the flowpath surface 94. The protrusion 109 can be located in between the first and second depressions 106 and 108, in the circumferential direction.

In the illustrated embodiment, the protrusion 109 is generally convex in shape. Furthermore, the protrusion 109 can be positioned aft of the forward edge 98F of the spacer 76 and forward of the aft edge 98A of the spacer 76. When installed in the assembly 70, the protrusion 109 can also be positioned aft of the leading edges 90L of the airfoils 74 and forward of the trailing edges 90T of the airfoils 74. As noted above, possible axial locations of leading and trailing edges 90L and 90T are illustrated in FIG. 3, for reference purposes. In that way, the protrusion 109 can be localized at a generally mid-chord region relative to the pair of adjacent airfoils 74 that are adjacent to the spacer 76. The protrusion 109 can have a normalized length that is approximately 93-94% of a root chord dimension of at least one of the airfoils 74, or a length that is substantially the same as that of at least one of the depressions 106 or 108.

Figure 9:
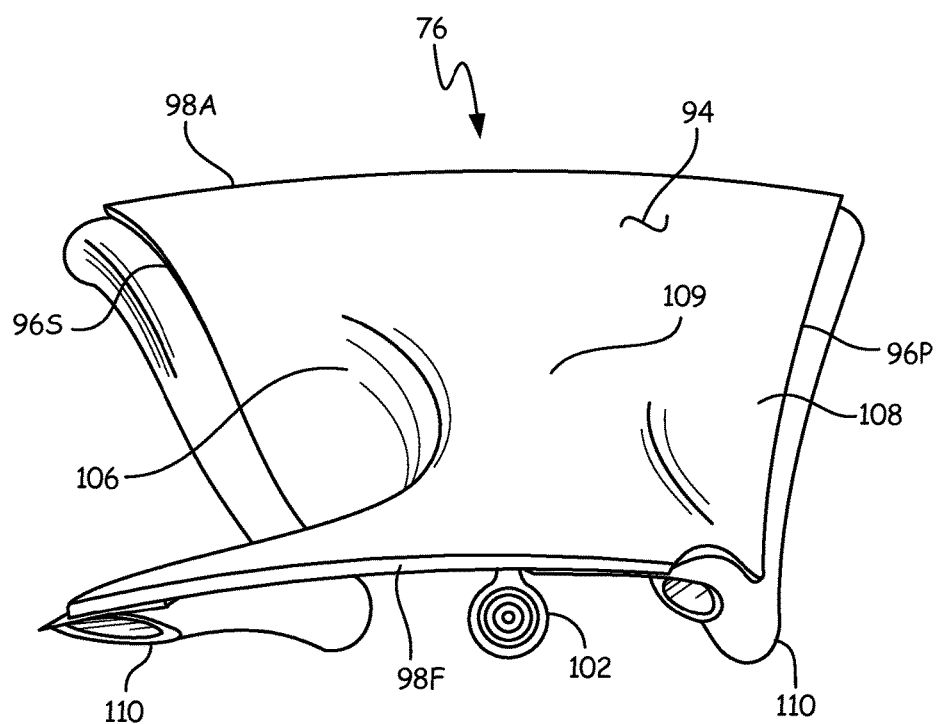
FIG. 9 is a front elevation view of the spacer and seal elements, shown in isolation.
Figure 10:
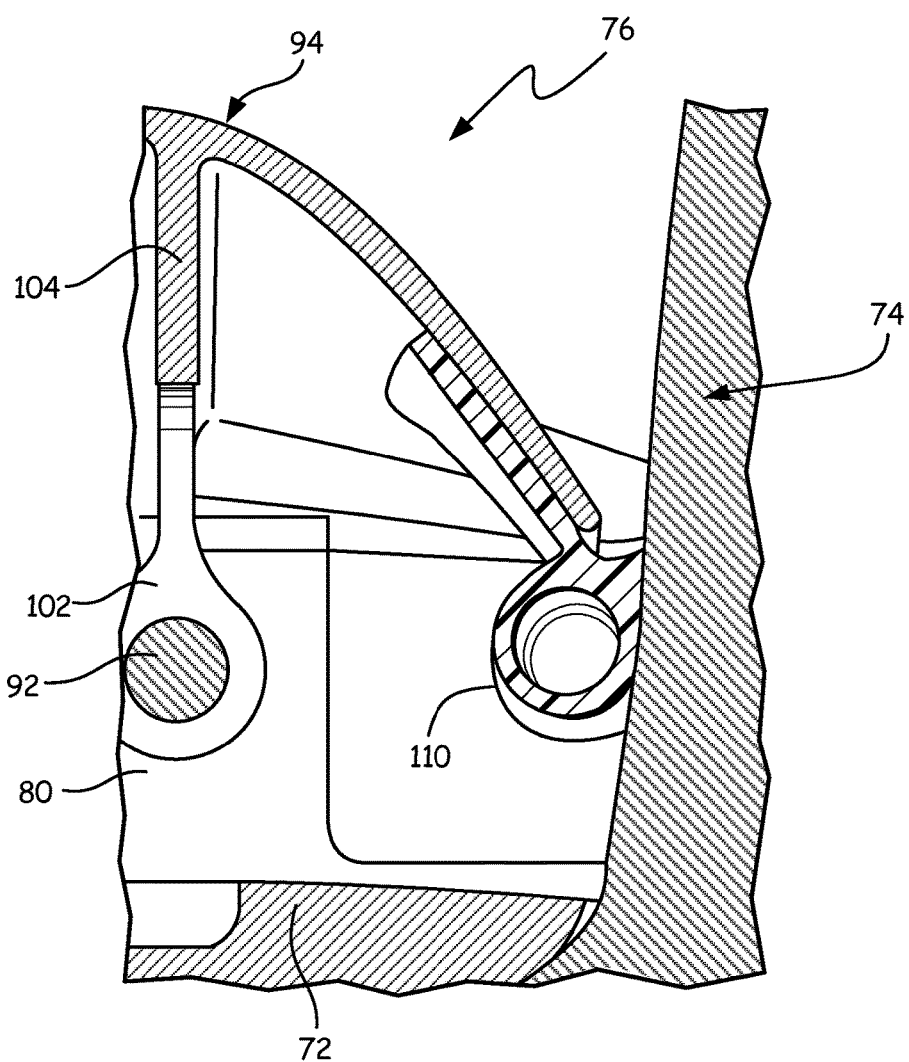
FIG. 10 is a cross-sectional view of a portion of the rotor assembly of FIG. 2.

FIG. 9 is a front elevation view of the spacer 76 and seal elements 110, shown in isolation. FIG. 10 is cross-sectional view of a portion of the rotor assembly 70 (taken at approximately the location of line 7-7 along the spacer 76 as shown in FIG. 5). As shown in FIGS. 9 and 10, one or more seal elements 106 can be provided with the spacer 76. As best seen in FIG. 10, small gaps are formed between the suction side edge 96S of the spacer 76 and the suction side 88S of the adjacent airfoil 74 and between the pressure side edge 96P and the pressure side 88P of the other adjacent airfoil 74. The seal elements 110 can be conventional sealing elements, such as bulb-type seal elements, that are flexible and conformable, such as being made of an elastomeric material. The seal elements 110 can be secured to the underside surface 100 of the spacer. In the illustrated embodiment, two seal elements 110 are provided, one along the suction side edge 96S and another along the pressure side edge 96P. The seal elements 110 each protrude from the respective edge 96S or 96P, and, where the underside surface 100 assumes substantially the same shape as the flowpath surface 94, can substantially conform to a shape of the flowpath surface 94, including substantially conforming to corresponding shapes of the first and second depressions 106 and 108, as shown in FIG. 9. In this way the seal elements 110 can provide further portions of the endwall and act as extensions of the flowpath surface 94 of the spacer 76. When installed in the assembly 70, as shown in FIG. 10, each seal element 110 can contact a corresponding surface 88S or 88P of the adjacent airfoil 74 and can at least partially fill the gaps between the airfoils 74 and the spacer 76.

In view of the entirety of the present disclosure, including the accompanying figures, persons of ordinary skill in the art will recognize that the present invention can provide numerous advantages and benefits. For example, the present invention can provide an endwall flowpath surface with a non-axisymmetric contour that can help reduce undesired secondary flow effects, increase adiabatic efficiency and increase flow capacity. This endwall flowpath surface can be implemented on spacers that are separate from airfoil structures. In certain applications, the endwall flowpath contour can alter a geometric relationship between the endwall flowpath surface and adjacent pressure and/or suction sides of adjacent airfoils, such as to provide smaller (i.e., tending to be more acute) angles between the flowpath surface and the airfoil pressure and/or suction sides. Furthermore, the present invention helps provide a relatively low-mass yet sufficiently stiff spacer and can provide relatively tight sealing between the spacer and the adjacent airfoils through the use of optional sealing elements. Other advantages and benefits will also be apparent to those of ordinary skill in the art.

Discussion of Possible Embodiments

The following are non-exclusive descriptions of possible embodiments of the present invention.

A spacer assembly for a rotor assembly of a gas turbine engine can include an endwall segment having a non-axisymmetric flowpath surface, wherein a perimeter of the flowpath surface includes a forward edge, an aft edge, a suction side edge and a pressure side edge; a first depression formed along the flowpath surface adjoining the suction side edge; and a second depression formed along the flowpath surface adjoining the pressure side edge.

The assembly of the preceding paragraph can optionally include, additionally and/or alternatively, any one or more of the following features, configurations and/or additional components:
  the first depression can be spaced from both the forward edge and the aft edge;
  the second depression can be spaced from both the forward edge and the aft edge;
  a stiffening rib formation located opposite the flowpath surface, wherein the stiffening rib formation includes a plurality of ribs;
  a first seal positioned along the suction side edge, wherein the first seal follows a shape of the first depression;
  a second seal positioned along the pressure side edge, wherein the first seal follows a shape of the second depression;
  the first and second depressions can be spaced apart in the circumferential direction;
  a maximum depth of the first depression can be approximately 6-8% of a length of the first depression; and/or
  a protrusion formed along the flowpath surface, located in between the first and second depressions in a circumferential direction.

A rotor assembly for a gas turbine engine can include a rotor disk; a plurality of airfoils matingly secured to the rotor disk; and a plurality of spacers each positioned between an adjacent pair of airfoils of the plurality of airfoils, at least one of the plurality of spacers including: an endwall segment with a non-axismmentric flowpath surface, wherein a perimeter of the flowpath surface is defined by a forward edge, an aft edge, a suction side edge and a pressure side edge; and a first depression formed along the flowpath surface adjoining one of the suction side edge and the pressure side edge.

The assembly of the preceding paragraph can optionally include, additionally and/or alternatively, any one or more of the following features, configurations and/or additional components:
  the first depression can be spaced from both the forward edge and the aft edge of the flowpath surface;
  each of the pair of airfoils can have a leading edge and a trailing edge, and the first depression can be positioned aft of the leading edge of the airfoil and forward of the trailing edge of the airfoil;
  a mounting structure extending from the endwall segment opposite the flowpath surface; and a fastener for securing the mounting structure to the rotor disk;
  a stiffening structure located opposite the flowpath surface, which can include a central rib; and a plurality of additional ribs extending from the central ribs at acute angles;
  a seal positioned along the endwall segment, wherein the seal follows a shape of the first depression;
  a second depression formed along the flowpath surface adjoining the other of the suction side edge and the pressure side edge;
  each of the pair of airfoils can have a leading edge and a trailing edge, and both the first depression and the second depression can be positioned aft of the leading edge of the airfoil and forward of the trailing edge of the airfoil;
  a first seal positioned along the endwall segment, wherein the first seal follows a shape of the first depression; and a second seal positioned along the endwall segment opposite the first seal, wherein the second seal follows a shape of the second depression;
  the first and second depressions can be spaced apart in the circumferential direction;
  at least one of the first and second depressions can have a length that is approximately 93-94% of a root chord length of at least one of the plurality of airfoils; and/or
  a protrusion formed along the flowpath surface, located in between the first and second depressions in a circumferential direction.

A rotor assembly for a gas turbine engine can include a rotor disk having one or more attachment features; a plurality of airfoils extending from the rotor disk, each airfoil having a suction side and an opposite pressure side; a spacer positioned between an adjacent pair of airfoils of the plurality of airfoils, the spacer including: an endwall segment with a flowpath surface, wherein a perimeter of the flowpath surface includes a forward edge, an aft edge, a suction side edge and a pressure side edge, wherein the suction side edge is positioned adjacent to the suction side of one of the pair of airfoils separated by a suction side gap, and wherein the pressure side edge is positioned adjacent to the pressure side of the other of the pair of airfoils separated by a pressure side gap; and a radial depression formed along the flowpath surface adjoining one of the suction side edge and the pressure side edge; a first seal positioned at least partially along the suction side gap; and a second seal positioned at least partially along the pressure side gap, wherein the first or second seal conforms to a shape of the depression.

The assembly of the preceding paragraph can optionally include, additionally and/or alternatively, any one or more of the following features, configurations and/or additional components:
  the spacer can be mechanically attached to the rotor disk, and wherein the pressure side edge and the suction side edge of the endwall segment are each radiused;
  a stiffening structure located opposite the flowpath surface, which can include a central rib; and a plurality of additional ribs extending from the central ribs at acute angles; and/or
  a protrusion formed along the flowpath surface, located in between the first and second depressions in a circumferential direction.

A spacer for a gas turbine engine can include an endwall segment having a flowpath surface; and a stiffening structure located opposite the flowpath surface. The stiffening structure can include a central rib; and a plurality of additional ribs extending from the central ribs at acute angles.

The spacer of the preceding paragraph can optionally include, additionally and/or alternatively, any one or more of the following features, configurations and/or additional components:
  a perimeter of the flowpath surface can include a forward edge, an aft edge, a suction side edge and a pressure side edge;
  a first seal element positioned along the suction side edge; and/or
  a second seal element positioned along the pressure side edge.

Any relative terms or terms of degree used herein, such as "substantially", "essentially", "generally" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, alignment or shape variations induced by thermal, rotational or vibrational operational conditions, and the like.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims. For instance, teachings of the present invention can be scaled or relative proportions adjusted as desired for particular applications.

The invention claimed is:

1. A spacer assembly for a rotor assembly of a gas turbine engine, the assembly comprising:
  an endwall segment having a non-axisymmetric flowpath surface and an underside surface opposite the non-axisymmetric flowpath surface, wherein a perimeter of the flowpath surface includes a forward edge, an aft edge, a suction side edge and a pressure side edge;
  a first depression formed along the flowpath surface adjoining the suction side edge;
  a second depression formed along the flowpath surface adjoining the pressure side edge; and
  a stiffening rib formation located-on the underside surface, wherein the stiffening rib formation includes a central rib extending axially along the underside surface between the first and second depressions and a plurality of additional ribs extending laterally from the central rib and along the underside surface, and wherein each of the plurality of additional ribs form an acute angle with respect to the central rib.

2. The assembly of claim 1, wherein the first depression is spaced from both the forward edge and the aft edge.

3. The assembly of claim 2, wherein the second depression is spaced from both the forward edge and the aft edge.

4. The assembly of claim 1, further comprising:
  a first seal positioned along the suction side edge, wherein the first seal follows a shape of the first depression; and
  a second seal positioned along the pressure side edge, wherein the second seal follows a shape of the second depression.

5. The assembly of claim 1, wherein the first and second depressions are spaced apart in the circumferential direction.

6. The assembly of claim 1, wherein a maximum depth of the first depression is approximately 6-8% of a length of the first depression.

7. The assembly of claim 1, further comprising:
  a protrusion formed along the flowpath surface, located in between the first and second depressions in a circumferential direction.

8. The spacer assembly of claim 1, wherein at least one of the first and second depressions has a length that is approximately 93% to 94% of a root chord length of an airfoil adjacent to the spacer assembly.

9. The spacer assembly of claim 1, wherein the plurality of additional ribs includes:
  a pair of opposing aft ribs; and
  a forward rib, wherein the aft ribs and the forward rib are spaced from the first and second depressions.

10. A rotor assembly for a gas turbine engine, the assembly comprising:
  a rotor disk;
  a plurality of airfoils matingly secured to the rotor disk, wherein each of the airfoils has a leading edge and a trailing edge; and
  a plurality of spacers each positioned between an adjacent pair of airfoils of the plurality of airfoils, at least one of the plurality of spacers comprising:
    an endwall segment with a non-axisymmentric flowpath surface, wherein a perimeter of the flowpath surface is defined by a forward edge, an aft edge, a suction side edge and a pressure side edge; and
    a first depression formed along the flowpath surface adjoining one of the suction side edge and the pressure side edge; and
    a second depression formed along the flowpath surface adjoining the other of the suction side edge and the pressure side edge, wherein both the first depression and the second depression are positioned aft of the leading edge and forward of the trailing edge of one of the pair of adjacent airfoils, and wherein at least one of the first and second depressions has a length that is approximately 93% to 94% of a root chord length of the one airfoil.

11. The assembly of claim 10, wherein the first depression is spaced from both the forward edge and the aft edge of the flowpath surface.

12. The assembly of claim 10, wherein the first depression is positioned aft of the leading edges of the airfoils and forward of the trailing edges of the airfoils.

13. The assembly of claim 10, further comprising:
  a mounting structure extending from the endwall segment opposite the flowpath surface; and
  a fastener for securing the mounting structure to the rotor disk.

14. The assembly of claim 10, further comprising:
  a seal positioned along the endwall segment, wherein the seal follows a shape of the first depression.

15. The assembly of claim 10, further comprising:
  a stiffening structure located on an underside surface opposite the flowpath surface, the stiffening structure comprising:

a central rib; and
a plurality of additional ribs extending from the central rib and along the underside surface at acute angles with respect to the central rib.

16. The assembly of claim 10, further comprising:
a first seal positioned along the endwall segment, wherein the first seal follows a shape of the first depression; and
a second seal positioned along the endwall segment opposite the first seal, wherein the second seal follows a shape of the second depression.

17. The assembly of claim 10, wherein the first and second depressions are spaced apart in the circumferential direction.

18. The assembly of claim 10, further comprising:
a protrusion formed along the flowpath surface, located in between the first and second depressions in a circumferential direction.

19. A spacer for a gas turbine engine, the spacer comprising:
an endwall segment having a flowpath surface and an underside surface located opposite the flowpath surface; and
a stiffening structure located on the underside surface, the stiffening structure comprising:
a single central rib extending axially along the underside surface; and
a plurality of additional ribs extending laterally from the single central rib and along the underside surface, wherein the respective axial extend of each additional rib is less than the axial extent of the single central rib, and wherein each of the additional ribs forms an acute angle with respect to the single central rib.

20. The spacer of claim 19, wherein a perimeter of the flowpath surface includes a forward edge, an aft edge, a suction side edge and a pressure side edge, the spacer further comprising:
a first seal element positioned along the suction side edge; and
a second seal element positioned along the pressure side edge.

* * * * *